Nov. 14, 1939.                W. L. DE BAUFRE                2,180,200
   METHOD AND APPARATUS FOR SEPARATING ETHYLENE FROM A GASEOUS MIXTURE
                           Filed June 13, 1936
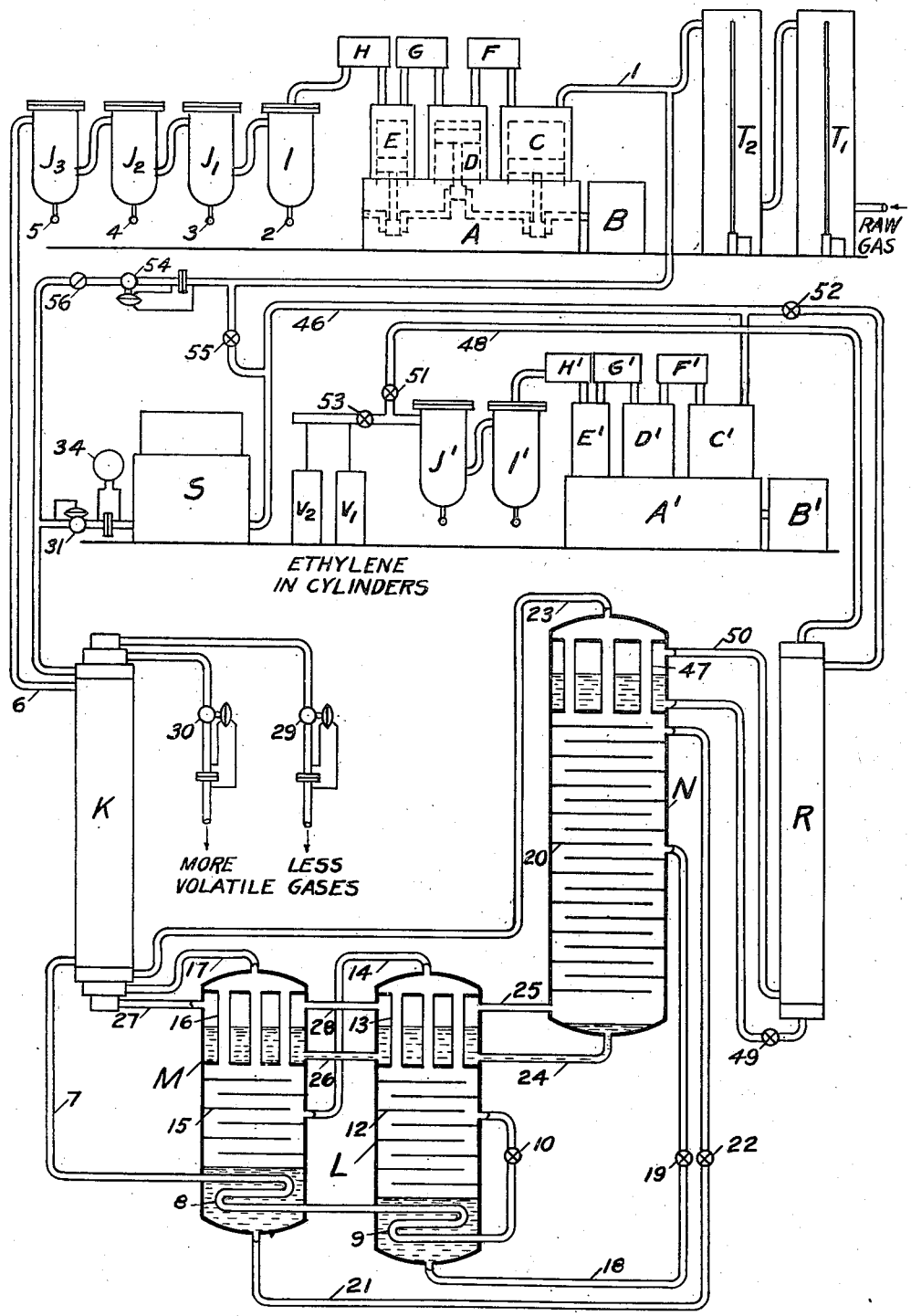
Wm. L. de Baufre
INVENTOR Patented Nov. 14, 1939

2,180,200

UNITED STATES PATENT OFFICE 2,180,200

METHOD AND APPARATUS FOR SEPARATING ETHYLENE FROM A GASEOUS MIXTURE

William Lane De Baufre, Lincoln, Nebr.

Application June 13, 1936, Serial No. 85,120

11 Claims. (Cl. 62—122)

This invention relates to the separation of gaseous mixtures by rectification and is particularly applicable to the separation of ethylene by cooling and rectifying below atmospheric temperature gaseous mixtures containing constituents more or less volatile than ethylene.

One of the objects of the invention is to secure a large yield of ethylene of high purity.

Another object is to obtain ethylene of high purity without separating the remaining gaseous mixture into constituents of high purity.

Another object is to control automatically the flows of raw gas to be separated and products produced therefrom whereby any desired yield and purity of ethylene may be maintained.

Another object is to augment the refrigeration available by compressing and throttling the gaseous mixture processed whereby a given plant may be operated at reduced capacity or sufficient refrigeration may be obtained to operate continuously a very small separation unit.

These objects and such other advantages as may hereinafter appear or are incident to the invention, are realized by the method and apparatus shown in preferred form in the accompanying drawing.

Referring to the drawing, the apparatus includes:

Decarbonating towers $T_1$ and $T_2$ with caustic solution circulating pumps, for purifying the raw gas of carbon dioxide, etc.

Compressor A driven by motor B and having three stages C, D and E with intercoolers F and G and aftercooler H for compressing the gaseous mixture to be separated and removing the heat of compression therefrom.

Separator I for removing condensed moisture from the compressed gaseous mixture.

Driers $J_1$, $J_2$ and $J_3$ for removing water vapor from the compressed gaseous mixture.

Interchanger K for regeneratively cooling the compressed gaseous mixture to a low temperature by heat exchange with returning products of rectification.

Preliminary rectifier L for separating the gaseous mixture into a liquid component containing a large part of the ethylene and most of the constituents less volatile than ethylene, and a gaseous component containing the remaining ethylene and most of the constituents more volatile than ethylene.

Scrubber M for liquefying most of the remaining ethylene and scrubbing therefrom constituents more volatile than ethylene in solution therein; also, for scrubbing ethylene from the remaining gaseous mixture containing most of the more volatile constituents.

Final rectifier N for rectifying the liquid component from premliminary rectifier L by utilizing liquid ethylene from scrubber M as a reflux liquid, thereby separating nearly pure ethylene in gaseous form from the liquid mixture without separating the commingled less volatile constituents.

Ethylene gas holder S for storing at low pressure the ethylene produced.

Compressor A' driven by motor B' and having three stages C', D' and E' with intercoolers F' and G' and aftercooler H' for compressing ethylene to a high pressure and removing the heat of compression therefrom.

Purifiers I' and J' for removing moisture and other impurities from the compressed ethylene.

Storage rack and cylinders $V_1$, $V_2$ for storing ethylene under high pressure.

Interchanger R for regeneratively cooling compressed ethylene by heat exchange with low pressure ethylene returning from the vaporizer at the top of final rectifier N.

Regulating and controlling devices and connecting piping as described hereinafter.

The apparatus shown on the drawing represents a further development of that described in patent application Serial No. 58,434, filed January 9, 1936.

For illustration, the gaseous mixture to be separated by cooling and rectification may be assumed to be composed of ethylene, more volatile constituents such as hydrogen, carbon monoxide and methane, and less volatile constituents such as ethane, propane, propylene, etc., carbon dioxide and some other impurities having been removed from the raw gaseous mixture by chemical treatment. In cooling such a gaseous mixture below its dew point, a portion is liquefied containing the less volatile constituents in larger proportion than in the original gaseous mixture. The more volatile constituents remain in the gaseous phase in greater proportion than in the original gaseous mixture. Simple cooling thus produces a rough separation of the original gaseous mixture. By a preliminary rectification, a more nearly complete separation of the more volatile constituents from the less volatile constituents is obtained than by simple cooling. The ethylene is divided between the gaseous component of the preliminary rectification which contains most of the more volatile constituents and the liquid component which contains most of the less volatile constituents.

By cooling the gaseous component of the preliminary rectification, a part of it is liquefied; and this liquid may be used to scrub the gaseous component of the preliminary rectification to recover ethylene therefrom in liquid form without separating the more volatile constituents into nearly pure substances. The liquid ethylene may be purified of more volatile gases by scrubbing it with vapor produced by boiling the liquid ethylene. The purified ethylene may then be utilized as a liquid reflux in a final rectification of the liquid component of the preliminary rectification, thereby obtaining nearly pure ethylene as the vapor product of the final rectification without separating the less volatile constituents into nearly pure substances. By properly proportioning the cooling and rectifying apparatus, a high yield of ethylene is obtained without waste of power in separating other constituents of the original gaseous mixture into nearly pure substances.

In order to separate ethylene from a gaseous mixture as described, it is necessary to cool the gaseous mixture and rectify it below atmospheric temperature. Refrigeration necessary to balance heat leak and other thermodynamic losses may be obtained by compressing the gaseous mixture, regeneratively cooling it in heat exchange with returning products of rectification, and then throttling the cooled compressed mixture to a lower pressure. There is a limit, however, to the amount of refrigeration that can be produced in this way from a given amount of the original gaseous mixture. Since the refrigeration required in a small plant is large in proportion to the amount of gas processed, there is a minimum limit to the size of separation unit that can be continuously operated below atmospheric temperature in this way.

But by augmenting the refrigeration supplied by compressing and throttling the gaseous mixture, by refrigeration from another source, there is no minimum limit to the size of separation unit that can be continuously operated. It is therefore proposed to augment the refrigeration from the gaseous mixture processed by refrigeration from a portion of the ethylene produced.

In one method of so doing, a portion of the ethylene produced is recycled commingled with the gaseous mixture processed, thereby maintaining the total flow of ethylene plus gaseous mixture sufficient to produce by compressing and throttling, the refrigeration required for continuous operation of the separation unit. This method also makes possible continuous operation of any plant at a reduced capacity of ethylene production by increasing the amount of ethylene recycled. The amount of gaseous mixture processed will automatically decrease as the ethylene recycled is increased.

In another method of augmenting the refrigeration supplied by compressing and throttling the gaseous mixture processed, a portion of the ethylene produced is compressed and throttled in a separate cycle. The resulting additional refrigeration is applied in the final rectification to increase the liquid reflux for separating nearly pure ethylene from the less volatile constituents. A single compressor may be utilized both for compressing ethylene for refrigeration purposes and for compressing ethylene into cylinders, provided a sufficiently high compression pressure is maintained for refrigeration purposes.

In any case, the raw gas containing ethylene to be separated from constituents more and less volatile than ethylene, enters decarbonating tower $T_1$ as indicated on the drawing. In flowing up through towers $T_1$ and $T_2$, the raw gas is purified of carbon dioxide and some other impurities by being subjected to down-flowing caustic solutions circulated by pumps. The purified gaseous mixture then flows through pipe 1 to three-stage compressor A.

This gaseous mixture is successively compressed in cylinder C, cooled in intercooler F, further compressed in cylinder D, cooled in intercooler G, further compressed in cylinder E and finally cooled in aftercooler H. The compressed gaseous mixture then flows through separator I where condensed moisture is mechanically separated from the compressed gaseous mixture and drained away through valve 2. In order to remove water vapor, the compressed gaseous mixture is passed through driers $J_1$, $J_2$ and $J_3$, which contain solid caustic potash or other material for removing water vapor from the gas flowing therethrough by absorption or adsorption. Sludge is drained away from these driers through valves 3, 4 and 5.

The dry compressed gaseous mixture flows through pipe 6 to interchanger K where it is regeneratively cooled by heat exchange with returning cold products separated from the gaseous mixture as hereinafter described. The drawing represents a tubular type of regenerator in which the several products flow through tubes between multicompartment heads while the compressed gaseous mixture flows around and across these tubes.

The cooled compressed gaseous mixture flows through pipe 7 to coiled tubes 8 and 9 where the gaseous mixture is further cooled while under the compression pressure in boiling the liquids within scrubber M and preliminary rectifier L respectively. The more or less liquefied gaseous mixture is throttled through valve 10 and enters preliminary rectifier L at an intermediate tray 12. The liquid phase is here separated from the vapor phase.

The liquid phase flows down from tray to tray while subjected to a vapor reflux produced by boiling the liquid which reaches coiled tubes 9. The interaction of rising vapor and down flowing liquid removes nearly all the more volatile constituents in solution in the liquid which finally accumulates in the bottom of preliminary rectifier L. The vapor phase rises through the trays above the inlet where it is subjected to liquid reflux produced by condensing some of the rising vapor within tubes 13 at the top of preliminary rectifier L. Interaction of rising vapor and down flowing liquid removes most of the less volatile constituents from the rising vapor.

As a result, the vapor which finally leaves preliminary rectifier L through pipe 14 contains nearly all the more volatile constituents in the original gaseous mixture and a portion of the ethylene therein, but very little of the less volatile constituents. The liquid which accumulates in the bottom of preliminary rectifier L consists of most of the less volatile constituents in the original gaseous mixture commingled with a large portion of the ethylene therein, but it contains practically none of the more volatile constituents in solution.

The vapor flowing through pipe 14 is discharged into scrubber M at an intermediate tray 15. Rising through the trays above the inlet, this vapor is subjected to the scrubbing action of a liquid reflux produced by condensing a portion of the rising vapor within tubes 16. This liquid reflux flows down from tray to tray below the inlet where it is subjected to the scrubbing action of a rising vapor reflux produced by boiling the liquid which finally reaches the bottom of scrubber M and accumulates around coiled tubes 8. As a consequence of these scrubbing actions, the liquid which accumulates in the bottom of scrubber M is nearly pure ethylene with very little of the more volatile constituents in solution therein, and the vapor, or gas, which leaves scrubber M through pipe 17 comprises the more volatile constituents in the original gaseous mixture with very little ethylene mixed therewith.

The liquid mixture of ethylene with most of the less volatile constituents in the original gaseous mixture, which accumulates in the bottom of preliminary rectifier L, flows through pipe 18 and is throttled through valve 19 into final rectifier N at an intermediate tray 20. The nearly pure ethylene liquid which accumulates in scrubber M, flows through pipe 21 and is throttled through valve 22 onto one of the topmost trays in final rectifier N. In flowing down from tray to tray, these liquids are subjected to a rising vapor reflux produced by boiling the liquid which finally reaches the bottom of final rectifier N. As a result of this rectifing action with nearly pure ethylene liquid as a liquid reflux, nearly pure ethylene vapor leaves the top of final rectifier N through pipe 23. The less volatile constituents in the original gaseous mixture leave the bottom of final rectifier N through pipe 24 as commingled liquids.

Part of these commingled liquids are vaporized by heat transfer through tubes 13 from the vapor condensing therein to provide liquid reflux for the preliminary rectification. The resulting vapor returns through pipe 25 to the bottom of final rectifier N to form vapor reflux for the final rectification. The remaining commingled less volatile liquids flow through pipe 26 and are vaporized by heat transfer through tubes 16 from the vapor condensing within these tubes to form liquid reflux for scrubbing the commingled more volatile constituents of the original gaseous mixture and for obtaining nearly pure ethylene liquid to utilize as a liquid reflux in the final rectification. The commingled vaporized less volatile constituents of the original gaseous mixture leave scrubber M through pipe 27. Pipe 28 is provided for flow of vaporized less volatile constituents in either direction between preliminary rectifier L and scrubber M as may be required.

The commingled less volatile constituents of the original gaseous mixture flowing through pipe 27, the commingled more volatile constituents of the original gaseous mixture flowing through pipe 17, and the nearly pure ethylene flowing through pipe 23, all return to the several compartments at the lower end of interchanger K. Flowing up through the tubes therein to the corresponding compartments at the top of interchanger K, these gases, warmed to about room temperature, leave through valves 29, 30 and 31 as indicated.

The commingled less volatile constituents flow through valve 29 and the commingled more volatile constituents flow through valve 30. Valves 29 and 30 automatically maintain substantially constant rates of flows through them as determined by pressure drops across orifices or otherwise. The separated ethylene flows through valve 31 which automatically maintains a substantially constant pressure within final rectifier N. Control chamber of valve 31 may, if desired, be connected directly to final rectifier N rather than to the pipe just ahead of valve 31 as indicated on the drawing. Valves 29, 30 and 31 are all adjustable so that any desirable rates of flow and final rectification pressure may be attained and maintained. Flow meter 34 is provided for measuring ethylene production.

Ethylene produced is stored in gas holder S and is drawn therefrom through pipe 46 by compressor A' where it is compressed for storage at high pressure in cylinders $V_1$, $V_2$, etc., impurities being removed in purifiers I' and J'.

During normal operation of an ethylene production plant of moderate capacity, three-stage compressor A is driven at substantially constant speed by motor B. Due to positive displacement of the piston within cylinder C, there is a substantially constant rate of mass flow of the gaseous mixture from pipe 1 through compressor A and interchanger K to the preliminary and final rectifiers of the separation unit. By adjustment of flow regulators 29 and 30, the yield and purity of ethylene is attained which the design proportions of the separation unit make possible. These results are then automatically maintained by flow regulating valves 29 and 30 in conjunction with pressure regulating valve 31. The ethylene separated is compressed by compressor A' and stored in cylinders $V_1$, $V_2$, etc., as rapidly as necessitated by the size of gas holder S.

During normal operation, valves 19 and 22 are regulated to maintain nearly constant levels of the liquids surrounding coiled tubes 9 and 8 within preliminary rectifier L and scrubber M respectively. Valve 10 is regulated to maintain a nearly constant level of the liquid surrounding tubes 13 and 16.

With a separation unit of small capacity, operation as above described would not provide sufficient refrigeration to balance heat leak and other thermodynamic losses in the separation unit. The refrigeration supplied by compressing and throttling the gaseous mixture separated may then be augmented by vaporizing liquid ethylene around tubes 47 within the vaporizer at the top of final rectifier N. Compressed ethylene from compressor A' is supplied through pipe 48 and is throttled through valve 49 into this vaporizer. Ethylene vapor returns from the vaporizer through pipe 50. Interchanger R is provided for cooling the high pressure ethylene before throttling by heat transfer to returning ethylene vapor which is warmed nearly to room temperature. By opening valves 51 and 52, this auxiliary ethylene refrigeration cycle may be put into operation. Valve 53 should be controlled manually or automatically to maintain a desirable compression pressure for refrigeration purposes as cylinders $V_1$, $V_2$, etc., are being filled.

Another way of augmenting the refrigeration supplied by compressing and throttling the gaseous mixture separated, is to commingle ethylene with the gaseous mixture before compression by adjusting automatic flow regulating valve 54 to maintain any desired rate of flow of ethylene therethrough. With positive displacement compressor A running at substantially constant speed, the gaseous mixture compressed is reduced by an amount equivalent to the ethylene commingled therewith. The refrigeration supplied by compressing and throttling the commingled ethylene compensates for the loss in refrigeration by reducing the gaseous mixture compressed and throttled. Hence, sufficient refrigeration is supplied to operate the separation unit continuously while processing a small amount of the raw gaseous mixture. The compressor and separation unit must be of sufficient size to compress and process the mixture of ethylene and raw gas.

It would be possible to increase the flow of ethylene in this way until the separation unit were operating on nearly pure ethylene. While this would rarely be desirable during normal operation, it would be advantageous at starting the plant. Valve 55 is provided for supplying ethylene directly from gas holder S for cycling through the plant at starting. After operating temperatures are reached and liquids are built up in the rectifier, valve 55 may be closed and valve 54 regulated to maintain any desired capacity of ethylene production below the maximum possible. Valve 56 is a non-return valve to prevent raw gas returning through valve 54. It would also be desirable to provide a valve to prevent flow of ethylene backwards through towers T2 and T1 while cooling down the separation unit.

Of course, raw gas can be recycled instead of ethylene for cooling the separation unit to operating temperatures.

Certain safety features may be provided to prevent admixture of atmospheric air with the gaseous mixture processed or with the ethylene compressed or recycled. Thus, the raw gas will usually be drawn into the decarbonating towers from a raw gas holder. Motor B may have an automatic release on its controller operated by the raw gas holder in its lowest position so that motor B could not be started and if running would be stopped when the raw gas holder is nearly empty. Motor B' may have a similar release connected to ethylene gas holder S. Valve 55 may also be arranged so that it could not be opened when ethylene gas holder S is nearly empty.

When flow of ethylene through valve 54 increases, the flows through valves 29 and 30 should be correspondingly reduced. This can be accomplished automatically, as by additional control chambers on valves 29 and 30 connected to the orifice adjacent to valve 54.

I claim:

1. Method of separating ethylene from a gaseous mixture containing constituents more and less volatile than ethylene, which includes subjecting the gaseous mixture to a preliminary rectification whereby a liquid component is obtained containing most of the less volatile constituents and some of the ethylene, and a gaseous component is obtained containing most of the more volatile constituents and the remaining ethylene, cooling said gaseous component to obtain a liquid of nearly pure ethylene, withdrawing the remaining gaseous component containing most of the more volatile constituents, and subjecting the liquid component containing ethylene and most of the less volatile constituents to a final rectification with the nearly pure ethylene liquid as a liquid reflux, whereby nearly pure ethylene is obtained as a gaseous product and most of the less volatile constituents remain in the liquid product of the final rectification.

2. Method of separating ethylene from a gaseous mixture containing constituents more and less volatile than ethylene as in claim 1, wherein liquid reflux for the preliminary rectification and vapor reflux for the final rectification are obtained by heat exchange between vapor from the preliminary rectification and liquid from the final rectification.

3. Method of separating ethylene from a gaseous mixture containing constituents more or less volatile than ethylene as in claim 1, wherein the less volatile constituents remaining in the liquid product of the final rectification are vaporized in cooling the gaseous component of the preliminary rectification to obtain a liquid of nearly pure ethylene.

4. Method of separating ethylene from a gaseous mixture containing constituents more and less volatile than ethylene as in claim 1, wherein the liquid of nearly pure ethylene is utilized for scrubbing the gaseous component of the preliminary rectification to recover ethylene therefrom before said liquid is utilized as a liquid reflux in the final rectification.

5. Method of separating ethylene from a gaseous mixture containing constituents more and less volatile than ethylene as in claim 1, wherein the liquid reflux in the final rectification is augmented by partly condensing rising vapor before withdrawing the gaseous product of the final rectification.

6. Method of separating ethylene from a gaseous mixture containing constituents more and less volatile than ethylene which includes subjecting the gaseous mixture to a preliminary rectification and to a final rectification whereby said gaseous mixture is separated into three components comprising respectively nearly pure ethylene, most of the more volatile constituents and most of the less volatile constituents, automatically regulating the withdrawal of the components comprising the more volatile constituents and comprising the less volatile constituents in order to maintain the rates of flows of these components substantially constant, and automatically regulating the withdrawal of the nearly pure ethylene component in order to maintain the pressure of final rectification substantially constant.

7. Apparatus for separating ethylene from a gaseous mixture including a rectifier for separating ethylene from said gaseous mixture, a compressor for compressing the separated ethylene to a high pressure, means for storing the ethylene at high pressure, means for throttling a portion of the ethylene from said high pressure and for utilizing the throttled ethylene as a refrigerant to produce liquid reflux in said rectifier.

8. Apparatus for extracting a constituent of a gaseous mixture by rectification below atmospheric temperature, including a compressor for compressing said gaseous mixture, means for throttling said gaseous mixture, a rectifier for separating said constituent from said gaseous mixture, a compressor for compressing the separated constituent into cylinders, means for throttling a portion of the compressed constituent, and means for utilizing the resulting liquefied constituent to augment the refrigeration supplied by compressing and throttling the gaseous mixture, whereby the heat leak into said apparatus is balanced at reduced operating capacity without raising the pressure of compression of said gaseous mixture.

9. Apparatus for separating ethylene from a gaseous mixture including decarbonating towers for purifying the gaseous mixture of carbon dioxide, a compressor for compressing the purified gaseous mixture, an interchanger for regeneratively cooling the purified gaseous mixture, means for throttling the purified gaseous mixture, a rectifier for separating ethylene from the purified gaseous mixture, and means for recycling the separated ethylene through said compressor, interchanger and rectifier without passing the ethylene through said decarbonating towers, whereby refrigeration supplied by compressing, regeneratively cooling and throttling the purified gaseous mixture is augmented by compressing, regeneratively cooling and throttling the ethylene.

10. Apparatus for separating a constituent of a gaseous mixture including decarbonating towers for purifying the gaseous mixture of carbon dioxide, a compressor for compressing the purified gaseous mixture, an interchanger for regeneratively cooling the purified gaseous mixture, means for throttling the purified gaseous mixture, a rectifier for separating said constituent from the purified gaseous mixture, and means for recycling the separated constituent through said compressor, interchanger and rectifier without passing the separated constituent through said decarbonating towers whereby refrigeration supplied by compressing, regeneratively cooling and throttling the purified gaseous mixture is augmented by compressing, regeneratively cooling and throttling the separated constituent.

11. Method of separating ethylene from a gaseous mixture containing constituents more and less volatile than ethylene by rectification below atmospheric temperature within apparatus having a certain amount of heat leak therein from the surroundings, which includes compressing, cooling and throttling said gaseous mixture whereby refrigeration is supplied to said apparatus, reducing the amount of said gaseous mixture to be separated below that necessary to balance said heat leak, and augmenting the refrigeration supplied by compressing, cooling and throttling separately from the gaseous mixture, a portion of the ethylene separated therefrom whereby said heat leak is balanced at the reduced operating capacity without raising the pressure of compression of said gaseous mixture.

WILLIAM LANE DE BAUFRE.